United States Patent [19]

Murphy et al.

[11] Patent Number: 5,216,731
[45] Date of Patent: Jun. 1, 1993

[54] FUSED BICONICAL TAPER FIBER OPTIC COUPLER STATION AND FABRICATION TECHNIQUES

[75] Inventors: Kent A. Murphy, Roanoke; Michael F. Gunther, Blacksburg; Richard O. Claus, Christiansburg; Randy L. Waldron, Blacksburg, all of Va.

[73] Assignee: Center for Innovative Technology, Herndon, Va.

[21] Appl. No.: 777,669

[22] Filed: Oct. 15, 1991

[51] Int. Cl.$^5$ .................................. G02B 6/26
[52] U.S. Cl. ........................................ 385/43
[58] Field of Search ........................ 385/42, 43

[56] References Cited

U.S. PATENT DOCUMENTS

| | | | |
|---|---|---|---|
| 4,054,366 | 10/1977 | Barnoski et al. | 350/96.15 |
| 4,291,940 | 9/1981 | Kawasaki et al. | 350/96.15 |
| 4,392,712 | 7/1983 | Ozeki | 350/96.16 |
| 4,400,055 | 8/1983 | Ozeki et al. | 385/43 |
| 4,426,215 | 1/1984 | Murphy | 65/4.21 |
| 4,449,781 | 5/1984 | Lightstone et al. | 350/96.15 |
| 4,550,974 | 11/1985 | Murphy | 350/96.15 |
| 4,763,977 | 8/1988 | Kawasaki et al. | 385/43 |
| 4,801,185 | 1/1989 | Bricheno | 385/43 X |
| 5,011,252 | 4/1991 | Thorncraft et al. | 385/43 X |
| 5,046,804 | 9/1991 | Fukuma et al. | 385/43 |

*Primary Examiner*—Akm E. Ullah
*Attorney, Agent, or Firm*—Whitham & Marhoefer

[57] ABSTRACT

Optic fiber coupler fabrication stations allow one-step packaging and reduce fabrication time. The optic fiber coupler fabrication stations produce a single piece construction of the coupler package with improved uniformity. Two linear translation stages are driven in opposing directions using left and right hand threaded rods connected to a common drive shaft driven by a small electric motor. Fibers to be coupled are clamped into the station to provide the necessary tension during the tapering process. The fibers are tied together using cotton thread, and an oxy-propane torch is used to fuse the fibers together while the two translation stages pull the fibers to form a biconical tapered region in the fibers.

10 Claims, 4 Drawing Sheets

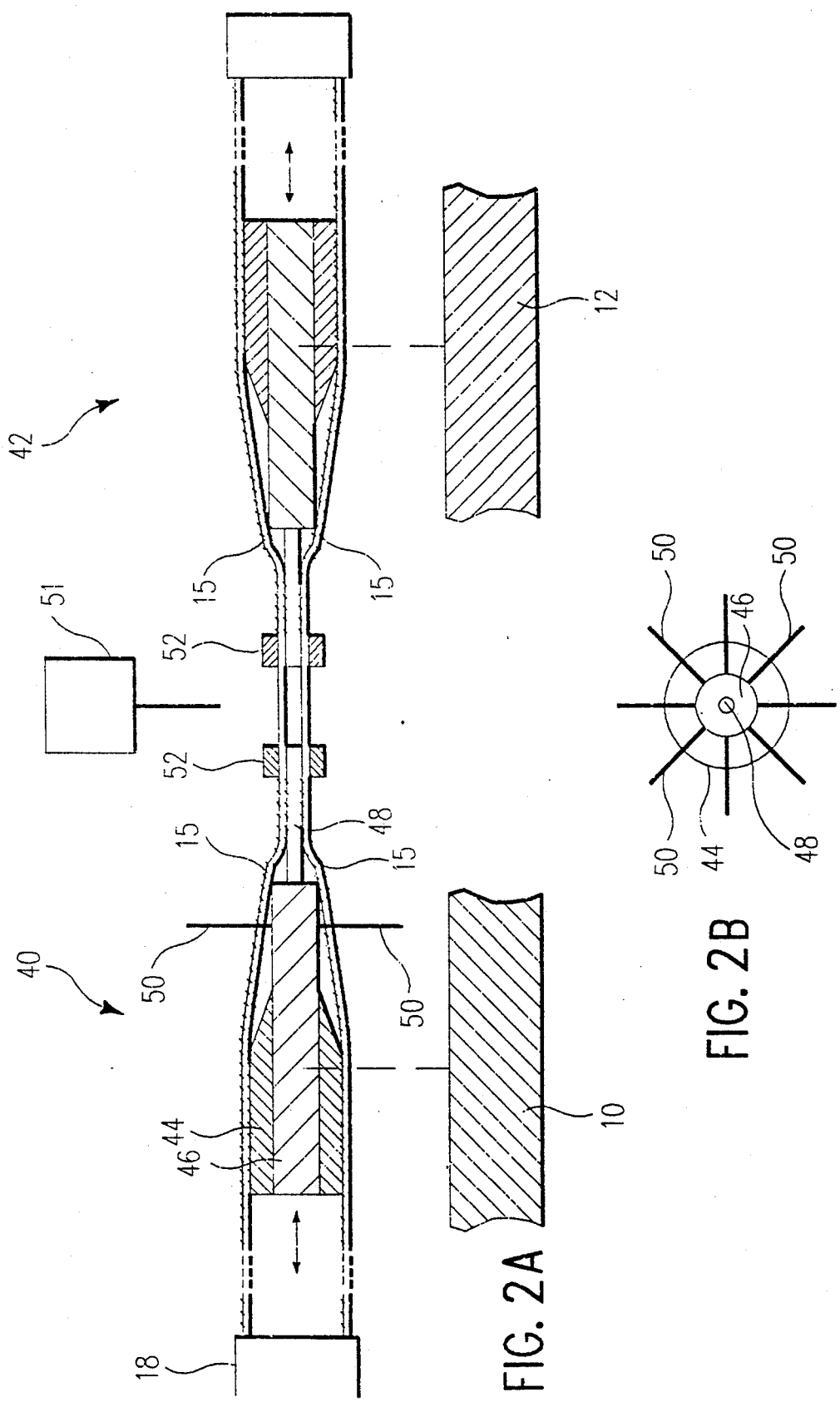

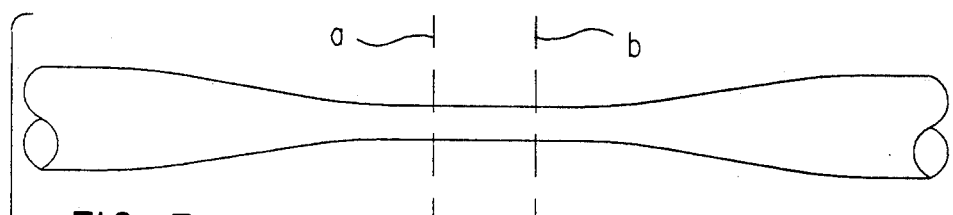
FIG. 3A
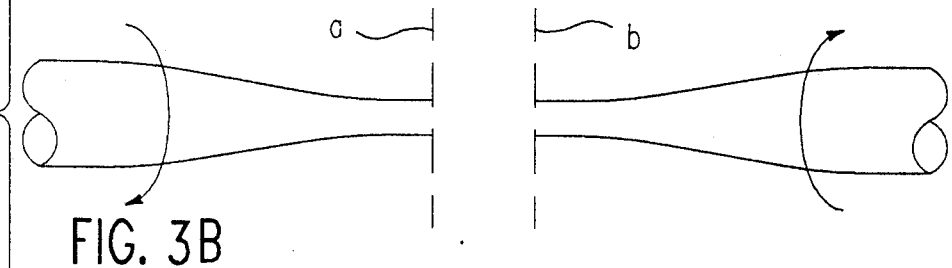
FIG. 3 { FIG. 3B
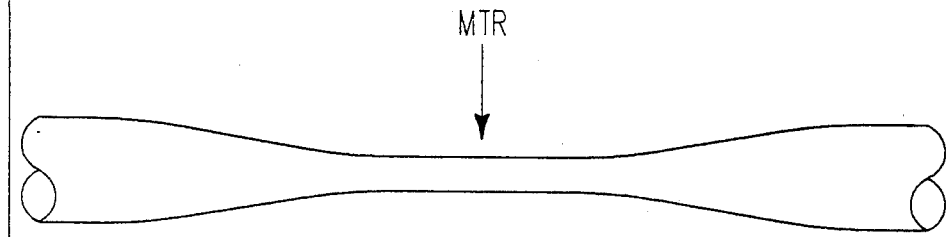
FIG. 3C

FUSED BICONICAL TAPER FIBER OPTIC COUPLER STATION AND FABRICATION TECHNIQUES

BACKGROUND OF THE INVENTION

1. Field of the Invention

The present invention generally relates to fiber optic couplers and, more particularly, to biconical-taper couplers and apparatus for the manufacture of such biconical-taper couplers.

2. Description of the Prior Art

Biconical-taper fiber optic couplers are well known in the art. The performance of a coupler is judged principally by the criteria of uniformity of distribution from the input fiber to the output fibers and the overall loss through the coupler. When measuring the uniformity of a fused biconical taper coupler during fabrication, the limiting factor is the extra output power in the fiber that is injected. The extra power comes from low order modes that are not coupled out of the injection fiber through the down taper. Only high order modes are transferred to the cladding in the minimum taper region. The up-taper redistributes the optical power among all of the fibers in the coupler. The low order modes can be redistributed by deforming the cores to produce a mixing region. A widely used method in use today to produce biconical couplers involves heating them in a region where they are bunched or twisted with the heated region in longitudinal tension. The following U.S. patents disclose various embodiments of such methods for forming biconical fiber optic couplers.

U.S. Pat. No. 4,426,215 to Murphy, discloses twisting fibers together, heating and then tapering to a minimum taper region (MTR). To improve uniformity of the coupler outposts, the MTR is deformed, either by scoring and breaking the MTR, or by pushing the MTR while heating to form a ball. Scoring takes place at the MTR and here the coupler is broken by pulling on opposite sides of the scored MTR. The ends of the two-pieces are then heated and pushed together to permanently rejoin the two regions.

U.S. Pat. No. 4,550,974 to Murphy, discloses low loss fused biconical taper fiber optic coupler that has a biconical taper region where the fibers are fused together. The MTR is deformed. The core material in the deformed region is scrambled with the cladding material as a result of the deformation process so that lower order modes are forced into the claddy.

U.S. Pat. No. 4,291,940 to Kawasaki et al., multimode optic fibers, each having a biconical taper section. The biconical taper sections of the fibers are fused together to provide optical coupling between the fibers. The fused fibers may also be twisted around one another to enhance mode mixing. The access couplers may be produced by fusing two fibers together along a small length, then heating the fused length and pulling the fibers to form the biconical tapers; or by twisting a portion of each of the fibers around one another, applying a tensile force to the twisted portions of the fibers and heating a region of the twisted fibers to soften and fuse a predetermined length of twisted fibers. If the fibers already have biconical taper sections, the access coupler may be produced by twisting the fibers together along their taper sections and heating a region of the taper sections to fuse them together.

U.S. Pat. No. 4,449,781 to Lightstone et al., discloses an optical fiber coupler for operatively coupling together two or more optical fibers. Each coupler consists of several biconically tapered fibers. The biconical sections of each fiber are placed side by side or twisted around one another, and fused together.

As those skilled in the art will appreciate, couplers in which core material is scrambled with the cladding provides an improved output uniformity, yet they are not altogether satisfactory in terms of uniformity of output distribution and low loss.

As also will be appreciated by those skilled in the art, in forming a biconical fiber optic coupler, the insulating jacket (typically a polymer) must be removed from the optic fibers in the region where the coupler is formed. After the coupler is formed, to mechanically support and mechanically stabilize the coupler, a stainless steel strip is epoxyed to the bare fibers and jacketed fibers on either side of the taper region. With prior apparatus for forming biconical-taper couplers, the fibers must be released and reclamped after the coupler is formed in order to secure the stabilizer strip; a time consuming operation.

SUMMARY OF THE INVENTION

It is therefore an object of the present invention to provide an optic fiber coupler fabrication station that allows one-step packaging and reduces fabrication time.

Another object of the invention is a coupler with improved uniformity of output distribution and low loss; a coupler in which the fiber cores material are not scrambled with fiber cladding matter.

Briefly, this invention contemplates the provision of a biconical fiber optic coupler that does not twist together the fibers to be coupled prior to forming the coupler and further contemplates a fixture for fabricating biconical couplers that allows a stabilizing strip to be epoxyed to the coupler and the jacketed fibers in one step.

The fixture has two locations on each side of the region where the biconical-taper coupler is to be formed. A clamp at the first location clamps jacketed fibers; a removable support at the second location supports the unjacketed fibers. The unjacketed fibers on either side of the coupler region are held in contact with one another by means bands such as cotton thread wrapped around the bundle, or preferably by means of a shape-memory alloy metal such as Nitinol. The biconical-taper coupler is formed by heating the unjacketed fibers suspended between the aligned removable supports while the clamps urge the fibers in opposite directions. After the coupler is formed, the supports are removed and an Invar stabilizer is epoxyed to the jacketed fibers on either side of the coupler and to the coupler itself.

In one embodiment of the invention, the fibers are bound together about 1 cm apart. An oxy-propane torch is used to heat the fibers so that they fuse together. At the same time, the two relatively movable translational stages to which the fibers are clamped are pulled apart to form a biconical tapered region in the fibers. The fibers are tapered until a desired coupling ratio is achieved. For couplers with more than three fibers, the uniformity of insertion loss at each port may be as high as 60%. The coupling region can be modified to improve the uniformity to a range of 30% or less by over-tapering the coupler, but this results in an excessive loss (e.g., 6dB—more than twice that typically acceptable). To reduce the loss, a section of the taper removed with a diamond scribe to form a minimum taper point with a desired diameter. One side of the coupler is then rotated relatively to the other to misalign the cores, and the two sides are then heated so they fuse together. In other embodiments of the invention, the coupler is tapered, and the region of the minimum taper point is formed with a "U"-shaped or "S"-shaped bend, or a series of microbends, in order to enhance mode mixing.

BRIEF DESCRIPTION OF THE DRAWINGS

The foregoing and other objects, aspects and advantages will be better understood from the following detailed description of a preferred embodiment of the invention with reference to the drawings, in which:

FIG. 1A is a schematic top plan view, and FIG. 1B is a schematic side elevation view.

FIG. 2A is a side elevation, with parts in section, of supports adapted to accommodate the manufacture of couplers comprised of more than eight fibers; FIG. 2B is an end view of the support.

FIGS. 3(A), (B) and (C) illustrate process steps for forming a coupler in accordance with one embodiment of the invention.

DETAILED DESCRIPTION OF A PREFERRED EMBODIMENT OF THE INVENTION

Figure 1A:
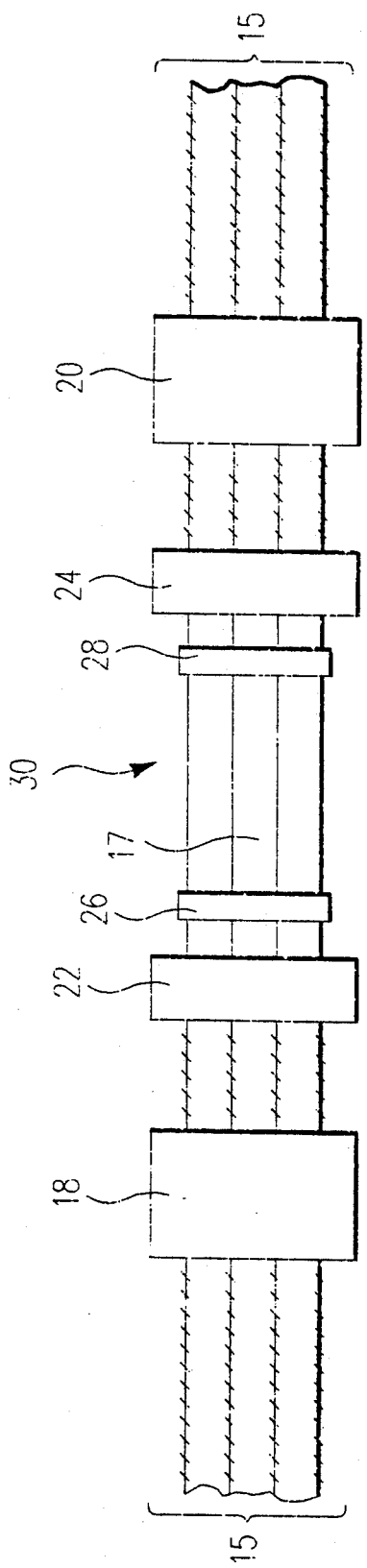
FIG. 1A and 1B are schematic diagrams of an apparatus for manufacture of biconical couplers in accordance with the teachings of this invention a support in this embodiment can accommodate on the order of eight fibers.
Figure 1B:
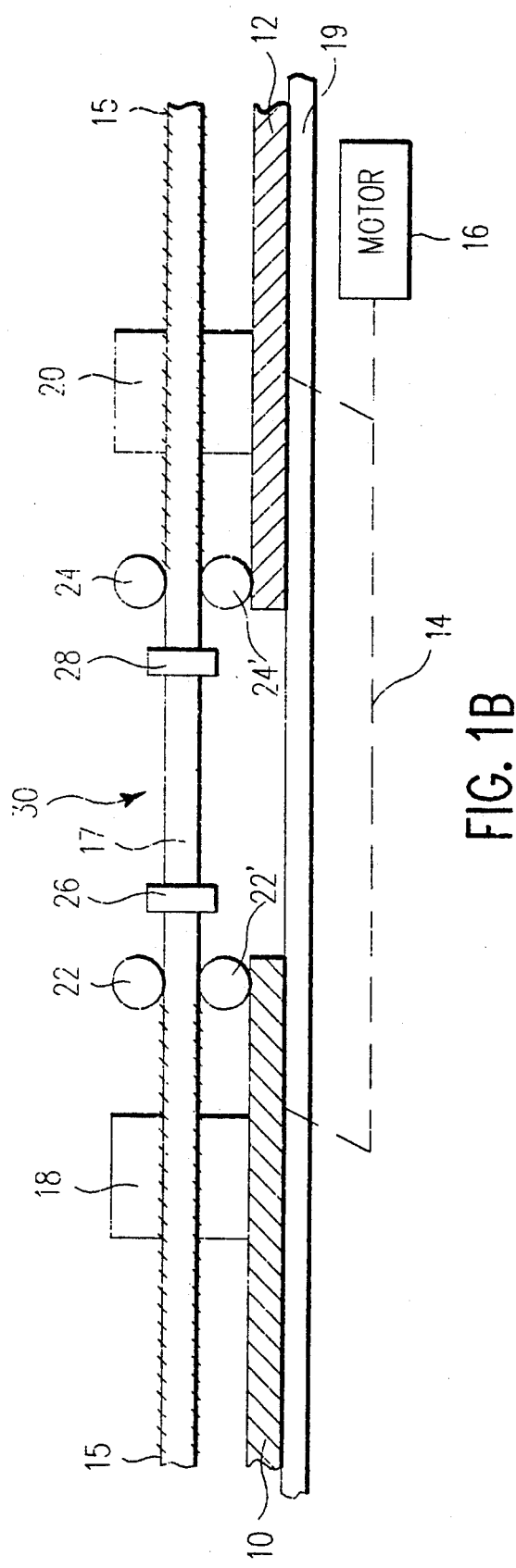

Referring now to the drawings, and more particularly to FIGS. 1A and 1B, a coupler manufacturing apparatus in accordance with this invention has two linear translation stages 10 and 12 that are driven in opposing directions using, for example, left-hand and right-hand threaded rods, indicated schematically as the dotted line 14. A small electric motor 16 drives the rods. A support 19, like an optical bench, supports the entire assembly with components in alignment.

A pair of clamps 18 and 20, secured respectively to stages 10 and 12, clamp fibers 15 (3 fibers in this illustrative embodiment) in a region where the fibers are jacketed. The jacketed region of the fibers is indicated by the short hash marks in the drawing. Typically, the clamps 18 and 20 are about 2 meters apart. A pair of bars 22 and 22' secured to station 10 support the unjacketed bare fibers on the left-hand side of a central region 17 where the coupler is to be formed. A corresponding aligned pair of bars 24 and 24' secured to station 12 support the unjacketed bare fibers on the right-hand side of the region. The supports 22—22' and 24—24' are typically spaced apart about 4 centimeters and preferably both sets of bars 22 or 24 is adjustably mounted with respect to the stage to which it is secured.

The clamps 18 and 20 exert a necessary force to place the central region 17 in tension during the tapering process with the bare fibers supported in a precisely horizontal position by the bar pairs 22—22' and 24—24'. Bands 26 and 28 bundle together the fibers on opposite sides of the region to be tapered; the bands are spaced apart about 1 centimeter. The bands 26 and 28 may be cotton thread, or preferably a shape-memory alloy such as Nitinol so the pressure exerted on the fiber bundle can be regulated by controlling a current coupled to the shape-memory alloy.

An oxy-propane torch, indicated schematically by the reference numeral 30, is used to fuse the fibers together while simultaneously the two translation stages 10 and 12 pull the fibers to form a biconical tapered region in the fibers. The fibers are tapered until the desired coupling ratios are achieved; in this step one fiber is injected with light, and the optical power in the fibers on the opposite side of the coupler are continuously monitored during the tapering process. The bar support pairs 22—22' and 24—24' shown in this FIG. 1 can accommodate two to eight fibers.

When the coupler is complete, bar pairs 22—22' and 24—24' used to support the bare fibers are removed, to allow a stabilizing strip (such as Invar) to be epoxyed to the coupler and to the jacketed fibers. An Invar strip (for four fibers or less) or "V"-shaped structure (for more than four fibers) is raised using a micropositioner to within a few microns of the coupler. Epoxy is used to attach the coupler to the Invar. A strip (used for four or less coupled fibers) is epoxyed to the bare fibers and to the jacketed fibers on either side of the taper region.

The coupler supports 22—22' and 24—24' shown in FIGS. 1A and 1B can accommodate two to eight fibers. While performing well in coupling up to eight optic fibers, there are applications which require the coupling of a larger plurality of optic fibers. FIG. 2 illustrates a bare fiber support that can be used in place of rod pairs 22—22' and 24—24' to accommodate up to 100 fibers.

As shown in FIGS. 2A and 2B, opposing identical supports indicated by the general reference numerals 40 and 42 are used to support the jacketed fibers. FIG. 2B illustrates a sectional view of either support. Each support comprises an outer mandrel 44 carrying an inner movable rod 46. A stainless steel tube 48 (or other suitable support such as a stainless steel needle) extends from the front of the rod 46. Fiber separators 50 extend radially outwardly from the rod 46 and facilitate the even distribution of the fibers around mandrel 44. Fibers to be coupled are distributed around the periphery of the supports 40 and 42, with the jacket removed from a fiber starting where the fiber leaves support tube 48. Cotton thread or shape-memory alloy bands 52 are used to hold the fibers in tight bundles while they are fused by a torch 51 and a taper is formed by driving stages 10 and 12 in opposite directions as previously explained. Two bands are used on either side of the coupler. After the coupler has been formed, bands 52 are removed. The coupler can be stabilized by raising a "V"-shaped Invar structure to within a few microns of the coupler and attached with epoxy. An epoxy with a fast cure time such as Devcon 5-minute is used to form a dam on both side of the taper region to prevent the more durable heat-cure epoxy from wicking onto the taper region. It will be appreciated, any material, with a higher index-of-refraction than the coupler, will cause excess loss in the coupler if it comes in contact with the taper region. The movable bar 46 is then retracted, removing the support 48. It will be appreciated that one or both of the supports 40 and/or 42 are preferably rotatably mounted with respect to the stages 10 and 12.

After tapering alone the maximum power is always in the throughput fiber (1 through N+1 or 2 through N+2). The lower order modes are still guided by the tapered fibers while the higher order modes are coupled to the cladding in the down taper. The power in the cladding is evenly distributed in all fibers on the up taper except for the throughput fiber which has a higher power due to the lower order modes that were never coupled to the cladding region. Some modification of the taper region is necessary to achieve a uniformity factor that is dependent upon factors other than the throughput fiber insertion loss. Modification techniques in accordance with the teachings of this invention will be described in connection with FIGS. 3-6.

The following are alternative methods for modifying the taper region in order to achieve a uniformity factor that is not dependent upon factors other than the throughput fiber insertion loss.

In one modification method, illustrated in FIG. 3, the coupling region is over tapered until the excess loss is more than twice the acceptable range (about 6 dB). A section of minimum taper region is removed by scribing in two places (a & b) on either side of the MTR with a diamond scribe (FIG. 3A) so that when refused a desired diameter is re-established for the minimum taper region. One side of the coupler is then rotated relative to the other (on the order of 20 to 40 degrees), to produce a misalignment of the cores (FIG. 3B). Then the two pieces are fused together so that the cores are misaligned due to the relative rotation, but the core material is not scrambled with the cladding material. If necessary, the refused process is retapered (FIG. 3C). This procedure can improve uniformity by as much as 30% for a sixteen fiber coupler.

Figure 4:
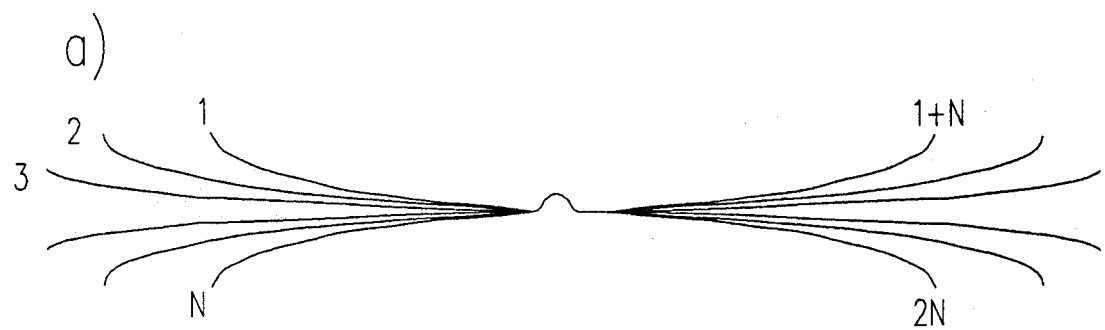
FIGS. 4, 5 and 6 illustrate couplers in accordance with alternate embodiments of the invention.

Referring now to FIG. 4, here the minimum taper region is heated and pushed to form a "U"-shape band 60. The sharp bend causes the low order modes to couple into the cladding. This method improves uniformity but causes some problems with coupler performance under vibration. The non-symmetric nature of the coupler (a relatively large mass to one side of the coupler) makes the coupler susceptible to break at resonant mechanical frequencies.

Figure 5:
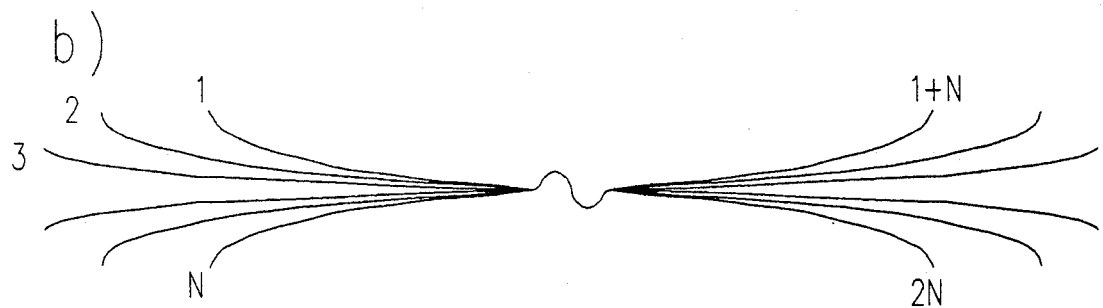

Referring now to FIG. 5, here the bends are smaller and they form an "S" shape; a geometry that reduces the vibration problems.

Figure 6:
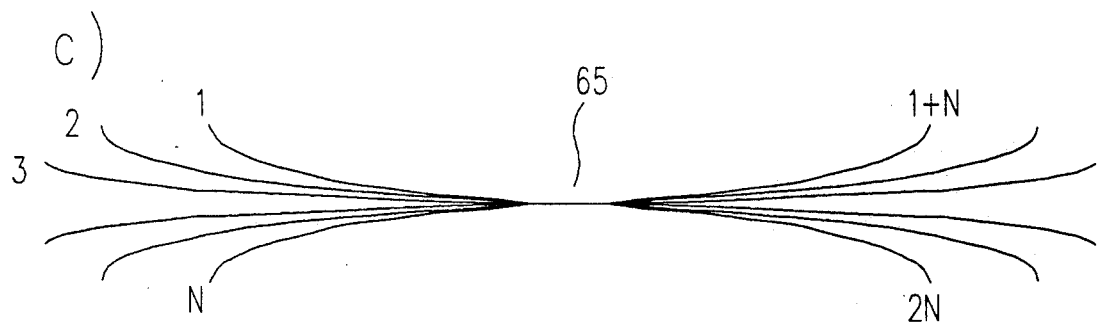

As illustrated in FIG. 6, small "microbends" 65 can be formed in the minimum taper region. The periodic nature of the microbends in the minimum taper region couple low order modes into the cladding to improve uniformity. The microbends can be individually created with a torch while pushing the coupler together or, they can be created using a heated frond.

Having thus described my invention, what I claim as new and desire to secure by Letters Patent is as follows:

1. Apparatus for fabricating a biconical-taper fiber-optic coupler, comprising in combination:
    a first stage and a second stage mounted on a support, said first stage and second stage relatively movable away from a central point located between first stage and said second stage;
    a clamp secured to each of said first stage and said second stage for clamping a plurality of optic fibers respectively to said first stage and said second stage;
    a removable support secured to each of said first stage and said second stage for supporting said plurality of optic fibers on either side of said central point inboard of said clamp with respect to said central point; and
    whereby said clamp on each stage clamps a jacketed region of said plurality of optic fibers and said removable supports and unjacketed region of said plurality of optic fibers so removable support can be removed after said coupler is formed while said plurality of optic fibers remains clamped in position.

2. Apparatus for fabricating a biconical-taper fiber-optic coupler as in claim 1, wherein said removable support comprises a pair of bars, one of said pair of bars disposed above said plurality of optic fibers and the other of said pair of bars disposed under said plurality of optic fibers.

3. Apparatus for fabricating a biconical-taper fiber-optic coupler as in claim 1, wherein said removable support comprises a mandrel around the periphery of which said plurality optic fibers is disposed forming a cone of fibers, and a thin needle centrally disposed with respect to said mandrel and relatively movable with respect thereto, whereby said a jacketed region plurality of optic fibers is supported by said thin needle during the formation of said coupler.

4. A method of forming a biconical-tapered fiber-optic coupler, comprising the steps:
    clamping a plurality of parallel disposed fibers to relatively movable stages on opposite sides of a region where said coupler is to be formed with a clamp that engages a jacketed portion of said fibers;
    supporting said plurality of parallel disposed fibers on said relatively movable stages on opposite sides of said region where said coupler is to be formed with a support that engages an unjacketed portion of said fibers;
    binding said parallel fibers together on both sides of said region where said coupler is to be formed;
    heating said region where said coupler is to be formed and urging said relatively movable stages apart to form a biconical-tapered coupler;
    removing said support while leaving said fibers clamped in place; and
    affixing a stabilizer to said coupler that extends to and engages the jacketed fibers.

5. A method of fabricating a biconical-taper fiber-optic coupler, comprising the steps of:
    forming a biconical-taper in a region where two or more optic fibers are fused together so that the region is over tapered in that the loss in the coupler exceeds an acceptable amount;
    cutting a taper region in two locations and removing a section of said taper region between said two location;
    rotating an end of said taper region at one location relative to an end of said taper region at said other location; and
    fusing together said ends.

6. A biconical-taper coupler for distributing higher order modes and lower order modes in input fiber uniformly to a plurality of output fibers, said plurality of output fibers including said input fiber, comprising a unitary unscrambled biconical-taper region including a first tapered region, a second tapered region, and a small bend in a minimum taper region between said first taper region and said second taper region, said bend confined in extent to said minimum taper region.

7. A biconical-taper coupler as in claim 6, wherein said bend is a "U"-shaped bend.

8. A biconical-taper coupler as in claim 6, wherein said bend is an "S"-shaped bend.

9. A biconical-taper coupler as in claim 6, wherein said bend comprises a plurality of microbends.

10. A biconical-taper coupler as in claim 6, wherein said plurality of output fibers includes at least three fibers.

* * * * *